United States Patent
Nagy et al.

(10) Patent No.: US 6,958,377 B2
(45) Date of Patent: Oct. 25, 2005

(54) OLEFIN POLYMERIZATION PROCESS

(75) Inventors: Sandor Nagy, Naperville, IL (US); Barbara M. Tsuie, Cincinnati, OH (US)

(73) Assignee: Equistar Chemicals, LP, Houston, TX (US)

(*) Notice: Subject to any disclaimer, the term of this patent is extended or adjusted under 35 U.S.C. 154(b) by 65 days.

(21) Appl. No.: 10/686,311

(22) Filed: Oct. 15, 2003

(65) Prior Publication Data

US 2005/0085602 A1 Apr. 21, 2005

(51) Int. Cl.$^7$ .............................. C08F 4/52; C08F 4/44; C08F 4/76
(52) U.S. Cl. ..................... 526/162; 526/171; 526/134; 526/129; 526/160; 526/170; 526/348; 526/348.2; 526/348.5; 526/348.6; 526/351; 526/352
(58) Field of Search ................................. 526/161, 172, 526/129, 130, 134, 348.2, 348.5, 348.6, 351, 352, 941, 943

(56) References Cited

U.S. PATENT DOCUMENTS

| | | | |
|---|---|---|---|
| 5,298,625 A | 3/1994 | Thottathil et al. | 548/406 |
| 5,539,124 A | 7/1996 | Etherton et al. | 548/402 |
| 5,637,659 A | 6/1997 | Krishnamurti et al. | 526/133 |
| 5,902,866 A | 5/1999 | Nagy et al. | 526/133 |
| 6,211,311 B1 | 4/2001 | Wang et al. | 526/131 |
| 6,232,260 B1 * | 5/2001 | Nagy et al. | 502/155 |
| 6,440,889 B1 | 8/2002 | Tsuie | 502/152 |
| 6,451,724 B1 | 9/2002 | Nifant'ev et al. | 502/103 |
| 6,541,583 B2 | 4/2003 | Meverden et al. | 526/127 |
| 6,559,251 B1 | 5/2003 | Wang et al. | 526/127 |
| 6,583,242 B2 * | 6/2003 | Beran et al. | 526/161 |
| 2003/0195306 A1 | 10/2003 | Tsuie et al. | 526/127 |

FOREIGN PATENT DOCUMENTS

| | | |
|---|---|---|
| WO | WO 99/24446 | 5/1999 |
| WO | WO 01/53360 | 7/2001 |

OTHER PUBLICATIONS

Buu–Hoi and Xuong, *J. Chem. Soc.* (1952) 2225.
Antilla, et al., *J. Am. Chem. Soc.*, 124 (2002) 11684.
Hartwig, et al., *J. Org. Chem.*, 64, (1999) 5575.

* cited by examiner

*Primary Examiner*—David W. Wu
*Assistant Examiner*—Rip A. Lee
(74) *Attorney, Agent, or Firm*—John Tyrell; Jonathan L. Schuchardt

(57) ABSTRACT

A process for polymerizing olefins is disclosed. The process uses an organometallic complex with at least one non-bridged indenoindolyl ligand bonded to M. The substituent on the indole nitrogen contains an atom selected from the group consisting of S, O, P, and N. Polyolefins from the process have unexpectedly high molecular weight compared with polyolefins made using similar supported indenoindolyl complexes.

16 Claims, No Drawings

OLEFIN POLYMERIZATION PROCESS

FIELD OF THE INVENTION

This invention relates to a process for polymerizing an olefin with a supported organometallic complex and an activator. The process gives increased polyolefin molecular weight.

BACKGROUND OF THE INVENTION

Many olefin polymerization catalysts are known, including conventional Ziegler-Natta catalysts. While these catalysts are inexpensive, they exhibit low activity and are generally poor at incorporating α-olefin comonomers. To improve polymer properties, single-site catalysts, in particular metallocenes are beginning to replace Ziegler-Natta catalysts.

Catalyst precursors that incorporate a transition metal and an indenoindolyl ligand are known. U.S. Pat. Nos. 6,232,260 and 6,451,724 disclose the use of transition metal catalysts based upon indenoindolyl ligands.

PCT Int. Appl. WO 01/53360 discloses open architecture indenoindolyl catalysts that may be supported on an inert support. U.S. Pat. No. 6,559,251 discloses a process for polymerizing olefins with a silica-supported, indenoindolyl Group 4–6 transition metal complex having open architecture. U.S. Pat. No. 6,211,311 teaches that many heterometallocenes are inherently unstable and this causes difficulties in supporting these catalysts; in particular, poor catalyst activity often results. This problem is avoided by using chemically treated supports to prepare supported catalysts containing heteroatomic ligands.

U.S. Pat. No. 6,541,583 discloses a process for polymerizing propylene in the presence of a Group 3–5 transition metal catalyst that has two non-bridged indenoindolyl ligands. Pending application Ser. No. 10/123,774, filed Apr. 16, 2002, discloses a process for polymerizing ethylene in the presence of a silica-supported Group 3–10 transition metal catalyst that has two bridged indenoindolyl ligands to obtain "ultra-high" molecular weight polyethylenes.

Despite the considerable research done on indenoindolyl complexes, there has been no indication of the importance of the substituent on the indole nitrogen. In the prior work, methyl or phenyl is the typical substituent although ethyl and trimethylsilyl have also been used. U.S. Pat. No. 6,451,724 describes the substituent on the indole nitrogen broadly for the bridged complexes. However, the reference gives no indication of the importance of indole substituents, and the examples have only methyl and phenyl substituents.

Non-bridged indenoindolyl complexes are easier to synthesize but give lower molecular weight (higher melt index) than their bridged counterparts. The need continues, however, for new ways to make polyolefins with increased molecular weight. Molecular weight affects several properties such as impact and toughness. For certain applications, high molecular weight polyolefins are required. The industry would also benefit from the availability of new processes that capitalize on the inherent flexibility of the indenoindolyl framework. When high molecular weight polyolefins are required, bridged complexes have been used. There is a need to be able to prepare high molecular weight polyolefins from the more available non-bridged indenoindolyl complexes.

SUMMARY OF THE INVENTION

The invention is a process for making polyolefins. The process comprises polymerizing an olefin in the presence of an activator and an organometallic complex. The complex comprises a Group 3 to 10 transition metal and a non-bridged indenoindolyl ligand that is bonded to the transition metal. The substituent on the indole nitrogen, which contains a basic atom selected from S, O, P, and N, provides an unexpected boost in polymer molecular weight when compared with other common substituents such as methyl or phenyl.

DETAILED DESCRIPTION OF THE INVENTION

The invention is an olefin polymerization process. The process enables high polyolefin molecular weight.

Suitable olefins for the polymerization are $C_2$–$C_{20}$ α-olefins such as ethylene, propylene, 1-butene, 1-hexene and 1-octene, cyclic olefins such as cyclohexene, and non-conjugated dienes such as ethylidene norbornene and mixtures thereof. Preferred olefins are ethylene, propylene, and mixtures thereof with α-olefins such as 1-butene, 1-hexene, and 1-octene. More preferably, ethylene is copolymerized with a $C_3$–$C_{20}$ α-olefin. Most preferably, ethylene is copolymerized with 1-butene, 1-hexene, or 1-octene.

Optionally, hydrogen is used in the polymerization to fine-tune the molecular weight. The amount of hydrogen needed depends upon the desired polyolefin molecular weight and flow. Generally, as the amount of hydrogen is increased, the polyolefin molecular weight decreases and the flow increases. Preferably, when very high molecular weight is desired, hydrogen is not used.

Suitable activators include alumoxanes, alkyl aluminums, alkyl aluminum halides, anionic compounds of boron or aluminum, trialkylboron and triarylboron compounds. Examples include methyl alumoxane (MAO), polymeric MAO (PMAO), ethyl alumoxane, diisobutyl alumoxane, triethylaluminum, diethyl aluminum chloride, trimethylaluminum, triisobutylaluminum, lithium tetrakis (pentafluorophenyl) borate, lithium tetrakis (pentafluorophenyl)aluminate, dimethylanilinium tetrakis (pentafluorophenyl)borate, trityl tetrakis(pentafluorophenyl) borate, tris(pentafluorophenyl)borane, triphenylborane, tri-n-octylborane, the like, and mixtures thereof. Selection of activator depends on many factors including the organometallic complex used and the desired polymer properties.

The organometallic complex contains a Group 3 to 10 transition metal. Preferably the transition metal is a Group 3–5 transition metal, more preferably a Group 4 transition metal. Most preferably, the transition metal is zirconium.

The organometallic complex contains an indenoindolyl ligand bonded to the transition metal. "Indenoindolyl" ligands are conveniently generated by deprotonating an indenoindole compound using a potent base. By "indenoindole compound," we mean an organic compound that has both indole and indene rings. The five-membered rings from each are fused, i.e., they share two carbon atoms. The rings can be fused such that the indole nitrogen and the only $sp^3$-hybridized carbon on the indenyl ring are "trans" to each other. Such is the case in an indeno[1,2-b]indole ring system such as:

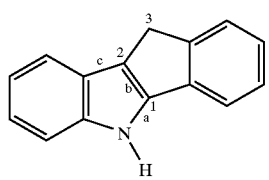

Suitable ring systems also include those in which the indole nitrogen and the $sp^3$-hybridized carbon of the indene are beta to each other, i.e., they are on the same side of the molecule. This is an indeno[2,1-b]indole ring system:

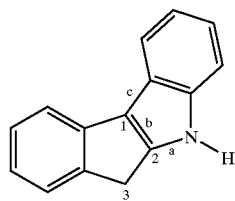

The ring atoms can be unsubstituted or substituted with one or more groups such as alkyl, aryl, aralkyl, halogen, silyl, nitro, dialkylamino, diarylamino, alkoxy, aryloxy, thioether, or the like. Additional fused rings can be present, as long as an indenoindole moiety is present.

Numbering of indenoindoles follows IUPAC Rule A-22. The molecule is oriented as shown below, and numbering is done clockwise beginning with the ring at the uppermost right of the structure in a manner effective to give the lowest possible number to the heteroatom. Thus, 5,10-dihydroindeno[1,2-b]indole is numbered as follows:

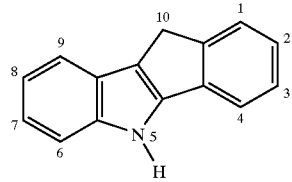

while 5,6-dihydroindeno[2.1-b]indole has the numbering:

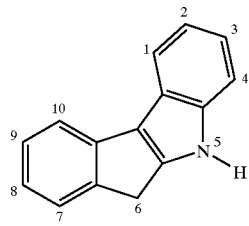

For correct nomenclature and numbering of these ring systems, see the *Ring Systems Handbook* (1998), a publication of Chemical Abstracts Service, Ring Systems File II: RF 33986-RF 66391 at RF 58952 and 58955. (Other examples of correct numbering appear in PCT Int. Appl. WO 99/24446 and U.S. Pat. No. 6,440,889.)

Methods for making indenoindole compounds are well known. Suitable methods and compounds are disclosed, for example, in U.S. Pat. Nos. 6,232,260, 6,451,724, and 6,559,251, the teachings of which are incorporated herein by reference, and references cited therein, including the method of Buu-Hoi and Xuong, *J. Chem. Soc.* (1952) 2225. Suitable procedures also appear in PCT Int. Appl. WO 01/53360.

The indolyl nitrogen of the indenoindolyl group has a substituent containing a basic atom. The basic atom is selected from the group consisting of S, O, P and N. Preferably, the basic atom is N or O.

One convenient method to prepare the indenoindole compounds is to prepare the indenoindole unsubstituted at the nitrogen and then react the indole nitrogen with an alkyl or aryl halide that contains a basic atom. The reaction of the indole nitrogen with an alkyl halide is described in U.S. Pat. Nos. 6,232,260, 6,451,724, and 6,559,251, and references cited therein, including the method of Buu-Hoi and Xuong, *J. Chem. Soc.* (1952) 2225. Suitable methods for the preparation of N-aryl indoles are described in *J. Am. Chem. Soc.* (2002) 11684, *J. Org. Chem.* (1999) 5575 and U.S. Pat. No. 5,298,625. Preferred indenoindolyl ligands have a structure selected from the group consisting of:

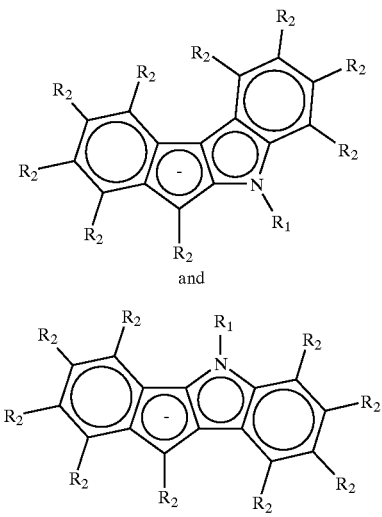

and in which $R_1$ is a $C_2$–$C_{30}$ radical containing an atom selected from the group consisting of S, O, P, and N; and each $R_2$ is independently selected from the group consisting of $C_1$–$C_{30}$ hydrocarbyl, H, F, Cl and Br.

Exemplary indenoindolyl structures include:

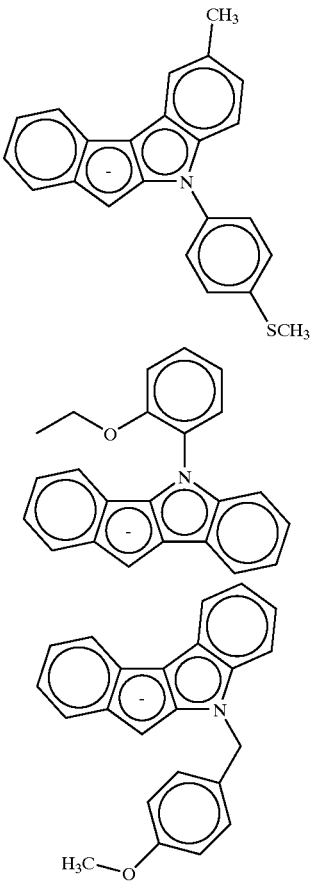

Additionally, the complex includes ancillary ligands that are bonded to the metal and satisfy the valence of the metal. The ancillary ligands can be labile or polymerization-stable, but usually at least one labile ligand (such as halides, alkoxys, aryloxys, alkyls, alkaryls, aryls, dialkylaminos, or the like) is present. Particularly preferred labile ligands are halides, alkyls, and alkaryls (e.g., chloride, methyl, benzyl). Suitable polymerization-stable ligands include cyclopentadienyl, indenyl, fluorenyl, boraaryl, indenoindolyl, and the like.

In a preferred process of the invention, the indenoindolyl complex has the general structure:

or wherein $R_1$ and $R_2$ are as defined above; M is a Group 3 to 10 transition metal; each L is independently selected from the group consisting of halide, alkoxy, aryloxy, siloxy, alkylamino, and $C_1$–$C_{30}$ hydrocarbyl; L' is selected from the group consisting of alkylamido, substituted or unsubstituted cyclopentadienyl, fluorenyl, indenyl, boraaryl, azaborolinyl and indenoindolyl; and x satisfies the valence of M.

The complexes can be made by any suitable method; those skilled in the art will recognize a variety of acceptable synthetic strategies. Often, the synthesis begins with preparation of the desired indenoindole compound from particular indanone and arylhydrazine precursors. The indenoindole is reacted to afford the required substitution at the indole nitrogen. Treatment with base gives a ligand precursor. The final step normally involves reaction of the ligand precursor with a transition metal source to give the organometallic complex. The exact synthetic steps and the sequence used will normally depend upon the other ligands used and the transition metal source.

The organometallic complex is preferably combined with a support material. The support material is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titania, zirconia, magnesium chloride, and crosslinked polystyrene. Most preferably, the support is silica.

Preferably, the silica has a surface area in the range of about 10 to about 1000 m²/g, more preferably from about 50 to about 800 m²/g and most preferably from about 200 to about 700 m²/g. Preferably, the pore volume of the silica is in the range of about 0.05 to about 4.0 mL/g, more preferably from about 0.08 to about 3.5 mL/g, and most preferably from about 0.5 to about 3.0 mL/g. Preferably, the average particle size of the silica is in the range of about 1 to about 500 μm, more preferably from about 2 to about 200 μm, and most preferably from about 5 to about 100 μm. The average pore diameter is typically in the range of about 5 to about 1000 angstroms, preferably about 10 to about 500 angstroms, and most preferably about 20 to about 350 angstroms. Preferably, the silica is dried before use. Preferably, the drying is done at a temperature of from about 100° C. to about 800° C., more preferably from about 150° C. to about 600° C.

A variety of different chemical treatments of the support can be used, including reaction with organo-aluminum, -magnesium, -silicon, or -boron compounds. See, for example, the techniques described in U.S. Pat. No. 6,211,311, the teachings of which are incorporated herein by reference.

The amount of organometallic complex added per gram of support material is preferably from 0.01 mmol/g to 0.8 mmol/g.

The activator can be added directly to the polymerization reactor before or after adding a supported organometallic complex. In other words, a supported complex—without the activator—can be prepared first. In one preferred process, a solution of the organometallic complex is combined with the support. The mixture is stirred in an inert atmosphere at a temperature of from about 0° C. to about 120° C., more preferably from about 20° C. to about 40° C. The optimum stirring time will vary somewhat, depending upon the amounts of solvent and support material, but should be long enough to ensure good mixing. Preferably, the stirring time is from about 2 minutes to about 60 minutes. Stirring longer than 60 minutes should not decrease activity, but it is unnecessary. Stirring 30 minutes at room temperature is convenient and gives good results. If a large amount of solvent is used, the mixture is a slurry and it is convenient to remove some of the solvent to prepare a free-flowing solid. This can be done at room temperature by applying a vacuum. In one preferred embodiment, an incipient wetness technique is used. A small amount of solvent is used to dissolve the complex and the solution is added to the support. The mixture remains a free-flowing solid without solvent removal. The mixture can be used as is or residual solvent may be removed.

In another preferred embodiment, a solution of the activator is added to the support prior to the addition of the organometallic complex. This solution can contain all of the activator to be used, but preferably, it contains a portion of the activator to be used. Any remaining activator can be premixed with the complex or can be added to the reactor at the start of the polymerization.

Even more preferably, the organometallic complex is premixed with a solution of some or all of the activator prior to addition to the support. Preferably, the organometallic complex and activator solution are premixed for a period of time between 1 minute and two hours. When the organometallic complex is premixed with a solution of the activator, it is preferable to use a portion of the activator and to add the remainder of the activator either to the support prior to the addition of the premix or directly to the reactor.

Preferably, a scavenging amount of an alkyl aluminum compound such as triethyl aluminum or triisobutyl aluminum is also added to the reactor. Preferably, the alkyl aluminum compound is added to the reactor prior to the addition of the supported complex.

While there are many ways to practice the olefin polymerization process of the invention, the process is preferably a slurry, solution, or gas-phase process. Slurry and gas-phase processes are particularly well-suited to the use of supported catalysts. Suitable methods for polymerizing olefins using the catalysts of the invention are described, for example, in U.S. Pat. Nos. 5,902,866, 5,637,659, and 5,539,124, the teachings of which are incorporated herein by reference.

The polymerizations can be performed over a wide temperature range, such as about −30° C. to about 280° C. A more preferred range is from about 10° C. to about 180° C.; most preferred is the range from about 30° C. to about 100° C. Olefin partial pressures normally range from about 0.1 MPa to about 350 MPa. More preferred is the range from about 0.1 MPa to about 7 MPa.

Catalyst concentrations used for the olefin polymerization depend on many factors. Preferably, however, the concentration ranges from about 0.01 micromoles transition metal per liter to about 100 micromoles per liter. Polymerization times depend on the type of process, the catalyst concentration, and other factors. Generally, polymerizations are complete within several seconds to several hours.

The following examples merely illustrate the invention. Those skilled in the art will recognize many variations that are within the spirit of the invention and scope of the claims.

EXAMPLE 1

Preparation of Complex 1-3

(a) Preparation of 8-methyl-5,10-dihydroindeno[1,2-b] indole 1-1. A 1 L 3-neck flask equipped with mechanical stirrer, reflux condenser, and glass stopper is charged with 1-indanone (46.1 g, 0.35 mol) and p-tolylhydrazine hydrochloride (55.5 g, 0.35 mol). Ethanol (550 mL) is added, and the mixture heated to gentle reflux with vigorous stirring to afford an orange slurry. Concentrated hydrochloric acid (30 mL) is added, the mixture heated to full reflux with stirring, and a precipitate forms within 10 minutes. The mixture is refluxed for 3 hours and cooled to room temperature. The slurry is filtered and washed with ethanol (300 mL), followed by 20% ethanol in water (400 mL) and hexanes (200 mL) to afford an off-white solid (63.3 g, 82.5%).

(b) Preparation of 5-(2-methoxybenzyl)-8-methyl-5,10-dihydro-indeno[1,2-b]indole 1-2. A flask equipped with a mechanical stirrer and reflux condenser is charged with a solution of sodium hydroxide (11.0 mL, 50 wt. % aqueous solution, 137.5 mmol), indenoindole compound 1-1 (5.00 g, 22.8 mmol), 2-methoxybenzyl chloride (4.8 mL, 34.5 mmol), Aliquat® 336 (tricaprylmethylammonium chloride, available from Aldrich Chemical Co.) (0.22 g, 2.41 mol. % versus indenoindole), water (70 mL), and methylene chloride (70 mL). The mixture is vigorously stirred with gentle reflux overnight. The stirring is stopped, and the layers are separated. The organic phase is washed with water (2×100 mL), dried over magnesium sulfate, and filtered. The volatiles are removed under vacuum to afford an oil, which solidifies upon cooling to room temperature. The solid is washed with methanol (50 mL) and dried (1.75 g, 22.7%). $^1$H NMR results are consistent with the proposed structure.

(c) Preparation of the Complex 1-3. Neutral indenoindole compound 1-2 (1.75 g, 5.18 mmol) is taken up in diethyl-ether (80 mL), and n-butyllithium (3.7 mL, 1.6 M in hexanes, 5.92 mmol) is added at room temperature. The solids are dissolved overnight. The solution is added to a slurry of cyclopentadienylzirconium trichloride (1.35 g, 5.17 mmol) in toluene (50 mL) and diethylether (30 mL). The slurry turns orange and is maintained at room temperature for 16 hours. The solid is filtered and washed with diethyl-ether (50 mL), followed by pentane (20 mL) and is then dried under vacuum (2.32 g, 73.8%). $^1$H NMR results are consistent with the proposed structure:

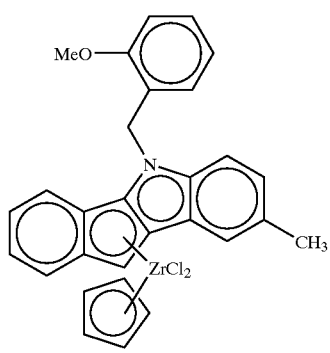

1-3

COMPARATIVE EXAMPLE 2

Preparation of Bridged Complex 2-5

(a) Preparation of Indenol[2,1-b]2-1. A mixture of 2-indanone (51.0 g, 0.39 mol) and p-tolylhydrazine hydrochloride (61.4 g, 0.39 mol) is dissolved in glacial acetic acid (525 mL) and is vigorously stirred and heated to reflux. The mixture turns red and is heated for 2 hours. After cooling to room temperature, it is poured into ice water (1 L). The precipitate is filtered to afford a solid, which is washed with water (about 1 L). The solid is dissolved in ethyl acetate (1.4 L), activated charcoal is added, and the mixture is gently warmed. The mixture is then cooled and filtered over a pad of Celite. The filtrate is dried over sodium sulfate, filtered, and is then concentrated to 450 mL and cooled to −30° C. for 3 days. The crystalline solid is filtered and washed with chilled (−78° C.) hexanes (2×500 mL). The beige solid is collected and dried under vacuum (47.1 g, 56%).

(b) N-Methylation of 2-1 to Give 2-2. A slurry of aqueous sodium hydroxide (42 mL, 21.5 M, 903 mmol), $C_{16}H_{33}NMe_3Br$ (0.36 g, 0.97 mmol), and 2-1 (15.0 g, 68.4 mmol) is combined with toluene (50 mL). A solution of methyliodide (8.0 mL, 129 mmol) in toluene (15 mL) is added dropwise at room temperature. The mixture is stirred at room temperature for 2.5 hours and then refluxed for an hour. The mixture turns red and is cooled to room temperature and filtered. The crystalline solid is washed with chilled (−30° C.) ethanol (200 mL) followed by chilled hexanes (200 mL) to afford a pale red solid (10.3 g. 65%).

(c) Anion Generation: Preparation of 2-3. n-Butyllithium (13.0 mL, 2.5 M in hexanes, 32.5 mmol) is added at room temperature to a slurry of 2-2 (4.94 g, 21.1 mmol) in toluene (125 mL). The mixture is maintained at room temperature and turns pale yellow. A precipitate forms after 2 hours. After 2 days, the mixture is filtered to give a pale beige solid. The solid is washed with toluene (60 mL), followed by hexanes (30 mL), and is then collected and dried under vacuum (4.37 g, 87%).

(d) Preparation of Dianion 2-4. Product 2-3 (4.57 g, 19.1 mmol) is suspended in toluene (100 mL). Diethyl ether (40 mL) is added dropwise to afford an orange solution, which is added to a solution of dichlorodimethylsilane (12.0 mL, 98.9 mmol) in diethylether (100 mL) at room temperature. The mixture turns cloudy and dirty beige and is stirred for 3 days and filtered to give a dark red-orange solution. Volatiles are removed under reduced pressure to afford an oily solid. An aliquot is analyzed by $^1$H NMR, revealing formation of the desired product; 100% conversion is presumed. The oily solid is dissolved in diethylether (140 mL), and sodium cyclopentadienide (11.0 mL, 2.0 M in THF, 22 mmol) is added. A precipitate forms immediately, and stirring continues for 2 days. The mixture is washed with water (3×50 mL), and the organic phase is dried over sodium sulfate and filtered. Volatiles are removed under vacuum to give an oily residue, and 100% conversion is assumed. The residue is dissolved in diethylether (75 mL) and cooled to −78° C. n-Butyllithium (18.0 mL, 2.5 M in hexanes, 45.0 mmol) is added by syringe, and the mixture is warmed to room temperature slowly. A yellow solid precipitates overnight, and volatiles are removed under vacuum. The crude material is washed with hexanes (100 mL) and filtered to afford a yellow powder. The powder is collected and dried under vacuum (6.73 g. 93%).

(e) Preparation of Complex 2-5. Zirconium tetrachloride (3.15 g, 13.5 mmol) is combined with toluene (100 mL) and dissolved in diethylether (50 mL) to produce a cloudy suspension. Dianion 2-4 (5.02 g, 13.7 mmol) is added as a solid in portions over the course of 30 minutes. The color turns from yellow to dark orange, and a precipitate forms. The mixture is maintained at room temperature for 2 days and is filtered to give a dirty yellow solid. The solid is washed with toluene (50 mL) and hexanes (50 mL). The yellow powder is collected and dried under vacuum (3.72 g, 53%).

The $^1$H NMR spectrum is consistent with the proposed structure:

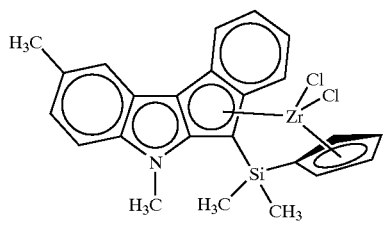

2-5

COMPARATIVE EXAMPLE 3

Preparation of Complex 3-2

(a) Preparation of 5-(4-fluorophenyl)-2-methyl-5,6-dihydridoindeno-[2,1-b]indole 3-1. A side-arm flask is charged with 5,6-dihydrido-2-methyl-indeno[2,1-b]indole, 1-1 (5.71 g, 26.1 mmol), 4-fluoroiodobenzene (3.8 mL, 32.9 mmol), CuI (4.96 g, 26.0 mmol), potassium phosphate (11.6 g, 54.7 mmol), and trans-1,2-diaminocyclohexane (1.6 mL, 13.3 mmol) in toluene (200 mL). The mixture is heated to gentle reflux for 48 hours under nitrogen, cooled to room temperature, filtered over a pad of silica gel, and washed with ethyl acetate (approximately 200 mL). The volatiles are removed under reduced pressure to afford a solid. Column chromatography is performed with silica gel and ethyl acetate:hexane (1:4) as eluent. The fractions are analyzed by thin layer chromatography (TLC), the corresponding fractions are combined, and volatiles are reduced to approximately 100 mL and cooled to −35° C. overnight. The crystalline solid is' filtered and washed with hexanes (30 mL), and dried under vacuum (4.24 g, 52%). $^1$H and $^{19}$F NMR results are consistent with the proposed structure.

(b) Preparation of 5-(4-fluorophenyl)-2-methyl-5,6-dihydroindeno-[2,1-b]indol-6-yl (cyclopentadienyl) zirconium dichloride 3-2. A flask is charged with neutral indenoindole compound 3-1 (2.40 g, 7.69 mmol) and diethylether (110 mL), and n-butyllithium (5.6 mL, 1.6 M in hexanes, 8.96 mmol) is added at room temperature. The solids dissolve immediately, and a yellow solid forms soon after. The mixture is filtered after 16 hours, and the solid is dried under vacuum (1.38 g, 56.1%). A flask is charged with cyclopentadienylzirconium trichloride (1.12 g, 4.29 mmol), toluene (80 mL), and diethylether (80 mL). The indenoindolyl anion (1.38 g, 4.32 mmol) is added as a solid, and the slurry turns red-orange, then yellow. The mixture is filtered after 16 hours, and the solid is washed with pentane (10 mL) and dried under vacuum (0.88 g, 35.2%). $^1$H and $^{19}$F NMR results are consistent with the proposed structure:

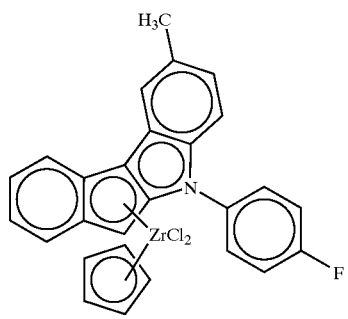

3-2

EXAMPLE 4

Preparation of Complex 4-1

In similar fashion as in Comparative Example 3, Complex 4-1 is prepared from 1-1 and 4-iodomethoxybenzene.

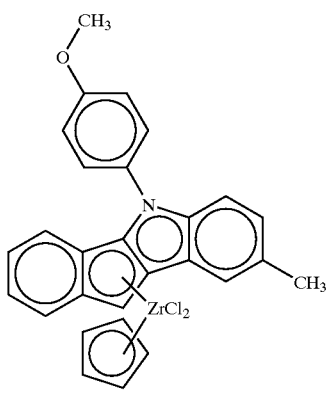

4-1

COMPARATIVE EXAMPLES 5-8

In similar fashion, the following complexes are made:

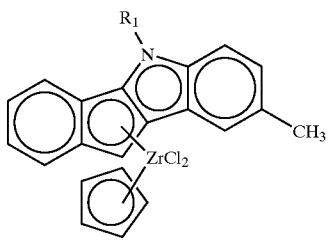

5-1 $R_1$=methyl (see Comp. Ex. 2(b) for N-methylation step)
6-1 $R_1$=4-fluorophenyl
7-1 $R_1$=4-methylphenyl
8-1 $R_1$=4-chlorophenyl

COMPARATIVE EXAMPLES 9-11

In similar fashion, the following complexes are made:

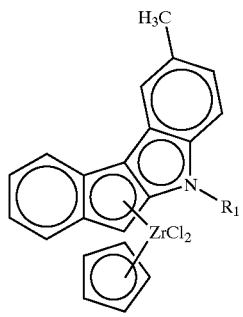

9-1 $R_1$=phenyl
10-1 $R_1$=4-methylphenyl
11-1 $R_1$=4-chlorophenyl

EXAMPLE 12

Polymerization

Silica (Crosfield ES 757, available from INEOS Silicas) is calcined at 250° C. for 4 hours. In a glove-box under nitrogen, a 30 wt. % solution of methylalumoxane (MAO) in toluene (1.85 mL) is slowly added to 0.01 g of indenoindolyl complex 1-3 from Example 1. The resulting solution is added slowly at room temperature to 1 g of the calcined silica and the mixture is stirred for 30 minutes resulting in a free-flowing supported catalyst.

A 2-L stainless-steel polymerization reactor is pressure purged with dry nitrogen three times at 75° C. A solution of 10 mL of 1-butene in 1 L isobutane and 1 mmol of triisobutyl aluminum are added to the reactor followed by 0.2 g of the supported complex. Ethylene is added to give a total reactor pressure of 2.1 MPa. Temperature is maintained at 75° C. and ethylene is fed on demand to maintain 2.1 MPa for one hour. After 30 minutes of polymerization, the reactor is vented to remove the volatiles. The polymer is removed from the reactor. From the weight of the polymer, the activity is calculated to be 102 kg polymer per g zirconium per hour. The melt index (MI) is measured according to ASTM D-1238, Conditions E and F. Condition E is immeasurably low and condition F is 2.7 dg/min.

EXAMPLE 15 AND COMPARATIVE EXAMPLES 13,14 AND 16–22

In similar fashion as Example 12, several polymerizations are performed varying only the complex used. Melt index ratio (MIR) is measured according to ASTM D-1238 and is the ratio of the melt index under condition F to the melt index under condition E. The complexes and results of the polymerizations are summarized in Table 1.

TABLE 1

Polymerizations

| Ex. | Complex | Activity kg/g Zr/hr | MI Cond. E | MI Cond. F | MIR |
|-----|---------|---------------------|------------|------------|-----|
| 12  | 1-3     | 102                 | Too low    | 2.7        |     |
| C13 | 2-5     | 600                 | Too low    | 1.0        |     |
| C14 | 3-2     | 159                 | 1.8        | 36         | 20  |
| 15  | 4-1     | 295                 | Too low    | 0.8        |     |
| C16 | 5-1     | 727                 | 0.4        | 7.2        | 18  |
| C17 | 6-1     | 409                 | 0.5        | 9.1        | 18  |
| C18 | 7-1     | 161                 | 1.0        | 22         | 22  |
| C19 | 8-1     | 448                 | 0.6        | 12         | 20  |
| C20 | 9-1     | 234                 | 1.3        | 29         | 22  |
| C21 | 10-1    | 209                 | 1.1        | 25         | 23  |
| C22 | 11-1    | 266                 | 1.7        | 35         | 21  |

The polymerizations performed with non-bridged complexes containing a basic atom in the substituent on the indole nitrogen (Examples 12 and 15) give much higher polymer molecular weight (lower MI) than non-bridged complexes in which the indole substituent does not contain S, O, P, or N (Comparative Examples 14 and 16–22).

The high polymer molecular weights obtained by the process of the invention (Examples 12 and 15) are comparable to those obtained with the bridged complex (Comparative Example 13), which is more difficult to prepare.

In sum, the results demonstrate the large benefit of using indole substituents with basic atoms. Polymerizations with these easily synthesized non-bridged complexes give polyolefins with unexpectedly high molecular weight.

The preceding examples are meant only as illustrations. The following claims define the invention.

We claim:

1. A process which comprises polymerizing an olefin in the presence of an activator and an organometallic complex, wherein the organometallic complex comprises a Group 3 to 10 transition metal, M, and at least one non-bridged indenoindolyl ligand that is bonded to M wherein the indenoindolyl ligand has a structure selected from the group consisting of:

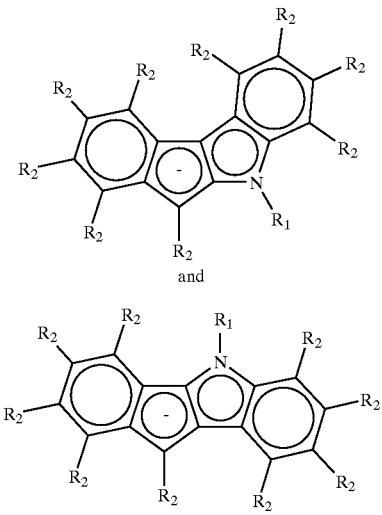

and in which $R_1$ is a $C_2$–$C_{30}$ radical containing an atom selected from the group consisting of S, O, P, and N; and each $R_2$ is independently selected from the group consisting of $C_1$–$C_{30}$ hydrocarbyl, H, F, Cl, and Br.

2. The process of claim 1 wherein the Group 3 to 10 transition metal is a Group 4 transition metal.

3. The process of claim 1 wherein the activator is selected from the group consisting of alumoxanes, alkylaluminum compounds, organoboranes, ionic borates, ionic aluminates, aluminoboronates, and mixtures thereof.

4. The process of claim 1 wherein the organometallic complex is combined with a support material and some or all of the activator is premixed with the organometallic complex prior to addition to the support material.

5. The process of claim 1 wherein the olefin is selected from the group consisting of ethylene, propylene, 1-butene, 1-pentene, 1-hexene, 1-octene, and mixtures thereof.

6. The process of claim 5 wherein the olefin is ethylene in combination with a second olefin selected from the group consisting of 1-butene, 1-hexene, and 1-octene.

7. The process of claim 1 wherein $R_1$ contains an ether group.

8. The process of claim 1 wherein $R_1$ contains a tertiary amine group.

9. The process of claim 1 wherein $R_1$ contains an aromatic ring substituted with an ether group.

10. The process of claim 1 wherein the complex is supported on silica.

11. The process of claim 1 wherein the polymerization is performed at a temperature within the range of about 30° C. to about 100° C.

12. A slurry polymerization process of claim 1.

13. A gas-phase polymerization process of claim 1.

14. The process of claim 1 wherein the organometallic has a structure selected from the group consisting of:

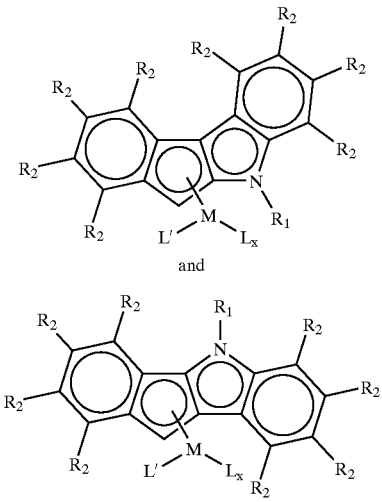

and wherein M is a Group 3 to 10 transition metal; each L is independently selected from the group consisting of halide, alkoxy, aryloxy, siloxy, alkylamino, and $C_1$–$C_{30}$ hydrocarbyl; L' is selected from the group consisting of alkylamido, substituted or unsubstituted cyclopentadienyl, fluorenyl, indenyl, boraaryl, pyrrolyl, azaborolinyl and indenoindolyl; x satisfies the valence of M; $R_1$ is a $C_2$–$C_{30}$ radical containing an atom selected from the group consisting of S, O, P, and N; and each $R_2$ is independently selected from the group consisting of $C_1$–$C_{30}$ hydrocarbyl, H, F, Cl, and Br.

15. The process of claim 14 wherein L' is selected from the group consisting of substituted or unsubstituted cyclopentadienyl, fluorenyl, indenyl, and indenoindolyl.

16. The process of claim 14 wherein $R_1$ contains an aromatic ring substituted with an ether group.

* * * * *